(12) United States Patent
Vismonte et al.

(10) Patent No.: US 11,409,834 B1
(45) Date of Patent: Aug. 9, 2022

(54) SYSTEMS AND METHODS FOR PROVIDING CONTENT

(71) Applicant: META PLATFORMS, INC., Menlo Park, CA (US)

(72) Inventors: Mark A. Vismonte, New York, NY (US); Quintin Chase Brandon, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 187 days.

(21) Appl. No.: 16/001,186

(22) Filed: Jun. 6, 2018

(51) Int. Cl.
*G06F 16/958* (2019.01)
*G06N 20/00* (2019.01)
*G06F 16/9535* (2019.01)
*G06F 16/957* (2019.01)
*G06Q 50/00* (2012.01)

(52) U.S. Cl.
CPC ........ *G06F 16/958* (2019.01); *G06F 16/9535* (2019.01); *G06F 16/9577* (2019.01); *G06N 20/00* (2019.01); *G06Q 50/01* (2013.01)

(58) Field of Classification Search
USPC ....................................................... 707/754
See application file for complete search history.

(56) References Cited

U.S. PATENT DOCUMENTS

| | | | | |
|---|---|---|---|---|
| 9,294,553 B1 * | 3/2016 | Vaswani | ............. | H04L 67/2847 |
| 9,591,339 B1 * | 3/2017 | Christie | ........... | H04N 21/25875 |
| 9,769,248 B1 * | 9/2017 | Krishnan | ................. | H04L 67/28 |
| 2005/0165849 A1 * | 7/2005 | Moradi | ............. | H04L 29/06027 |
| 2008/0256394 A1 * | 10/2008 | Rashevsky | .......... | G06F 11/3616 714/38.1 |
| 2010/0313239 A1 * | 12/2010 | Chakra | ............... | G06F 21/6218 726/2 |
| 2012/0284736 A1 * | 11/2012 | Friedman | ................ | H04H 20/22 725/14 |
| 2013/0067021 A1 * | 3/2013 | Broberg | .................. | H04L 65/60 709/217 |
| 2013/0132727 A1 * | 5/2013 | Petrovic | ............. | H04N 21/4627 713/176 |
| 2013/0339519 A1 * | 12/2013 | Lientz | ................. | H04L 41/0896 709/224 |
| 2014/0040721 A1 * | 2/2014 | Brownlow | .............. | G06F 40/14 715/234 |
| 2014/0173415 A1 * | 6/2014 | Kattil Cherian | ...... | H04L 41/069 715/234 |
| 2014/0189056 A1 * | 7/2014 | St. Clair | ............... | H04L 67/303 709/217 |
| 2014/0324640 A1 * | 10/2014 | Rugged | ................ | G06Q 10/087 705/28 |

(Continued)

*Primary Examiner* — Hosain T Alam
*Assistant Examiner* — Nicholas E Allen
(74) *Attorney, Agent, or Firm* — Sheppard Mullin Richter & Hampton LLP

(57) ABSTRACT

Systems, methods, and non-transitory computer-readable media can, for a first content item comprising a plurality of scan versions, calculate render scores for at least some of the plurality of scan versions, each render score being indicative of a likelihood of an associated scan version to render successfully on a first client computing device. A first scan version of the plurality of scan versions is selected based on the render scores. The first scan version of the first content item is transmitted to the first client computing device.

20 Claims, 7 Drawing Sheets

(56) References Cited

U.S. PATENT DOCUMENTS

| | | | | |
|---|---|---|---|---|
| 2014/0365349 A1* | 12/2014 | Kennon | ............ | G06Q 30/0269 |
| | | | | 705/34 |
| 2015/0178333 A1* | 6/2015 | Webster | ................ | G06Q 30/02 |
| | | | | 707/737 |
| 2016/0103559 A1* | 4/2016 | Maheshwari | ......... | G06F 3/0481 |
| | | | | 715/738 |
| 2016/0103883 A1* | 4/2016 | Ramani | ................ | G06Q 10/00 |
| | | | | 707/725 |
| 2016/0127802 A1* | 5/2016 | Carney | ................ | G06Q 30/02 |
| | | | | 725/14 |
| 2016/0353172 A1* | 12/2016 | Miller | ................... | G06F 3/0482 |
| 2016/0358101 A1* | 12/2016 | Bowers | ................ | G06N 20/00 |
| 2017/0099342 A1* | 4/2017 | Chien | ................ | H04L 67/2823 |
| 2017/0133054 A1* | 5/2017 | Song | ...................... | G11B 27/28 |
| 2017/0230433 A1* | 8/2017 | Carlos | ................ | H04L 65/4015 |
| 2017/0339229 A1* | 11/2017 | Miller | .................... | H04L 67/26 |
| 2017/0357655 A1* | 12/2017 | Marchiori | ........... | G06F 3/04842 |
| 2017/0359580 A1* | 12/2017 | Su | ....................... | H04N 19/103 |
| 2017/0372046 A1* | 12/2017 | Thomee | ............. | G06F 16/9017 |
| 2018/0011931 A1* | 1/2018 | Modani | ................... | G06F 40/30 |
| 2018/0098131 A1* | 4/2018 | Zhou | .................... | H04N 19/597 |
| 2018/0103079 A1* | 4/2018 | Lewis | ............... | H04N 21/2387 |

* cited by examiner

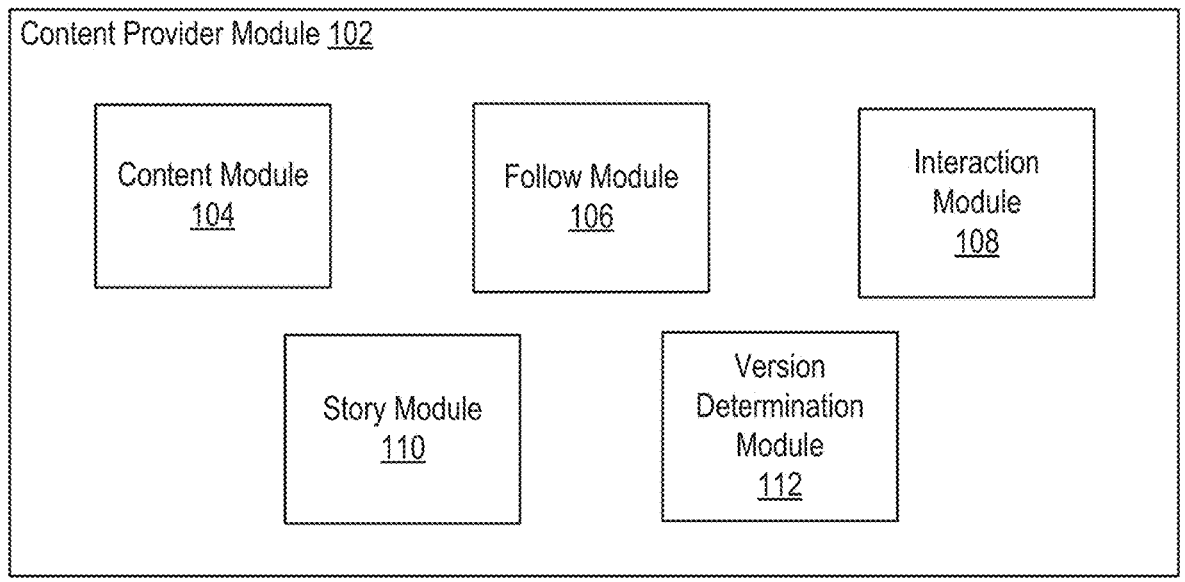
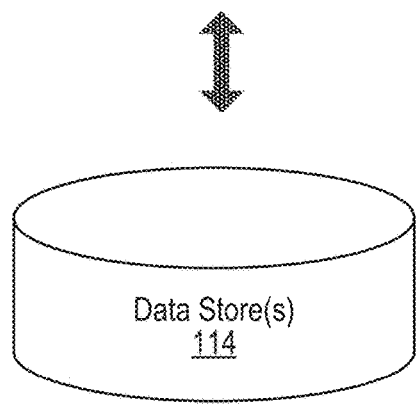
FIGURE 1

400

For a first content item comprising a plurality of scan versions, calculate render scores for at least some of the plurality of scan versions, each render score being indicative of a likelihood of an associated scan version to render successfully on a client computing device
402

Select a first scan version of the plurality of scan versions based on the render scores
404

Transmit the first scan version of the first content item to the client computing device
406

FIGURE 4

SYSTEMS AND METHODS FOR PROVIDING CONTENT

FIELD OF THE INVENTION

The present technology relates to the field of content distribution. More particularly, the present technology relates to techniques for distributing content to users in a computer networking environment.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to, for a first content item comprising a plurality of scan versions, calculate render scores for at least some of the plurality of scan versions, each render score being indicative of a likelihood of an associated scan version to render successfully on a first client computing device. A first scan version of the plurality of scan versions is selected based on the render scores. The first scan version of the first content item is transmitted to the first client computing device.

In an embodiment, the render scores are calculated based on a machine learning model.

In an embodiment, the machine learning model is trained based on training data, and the training data comprises a first set of instances labeled as successful renders and a second set of instances labeled as unsuccessful renders.

In an embodiment, the first set of instances comprises one or more instances that are labeled as successful renders based on a threshold number of scans of a content item having been successfully transmitted to a client computing device before the content item moved out of view on the client computing device.

In an embodiment, the machine learning model is configured to calculate a render score for a scan version of a content item based on a file size for the scan version of the content item.

In an embodiment, the first scan version is selected based on a determination that the first scan version is a scan version of a highest level of quality that also satisfies a render score threshold.

In an embodiment, content information is transmitted to the first client computing device. The content information identifies the first content item and the first scan version of the first content item.

In an embodiment, the content information identifies a plurality of content items, and scan versions for each content item of the plurality of content items.

In an embodiment, the content information is transmitted in a JSON file format.

In an embodiment, a request for the first scan version of the first content item is received from the client computing device.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates an example system including a content provider module, according to an embodiment of the present disclosure.

FIG. 4 illustrates example method associated with content provision, according to an embodiment of the present disclosure.

Figure 2:
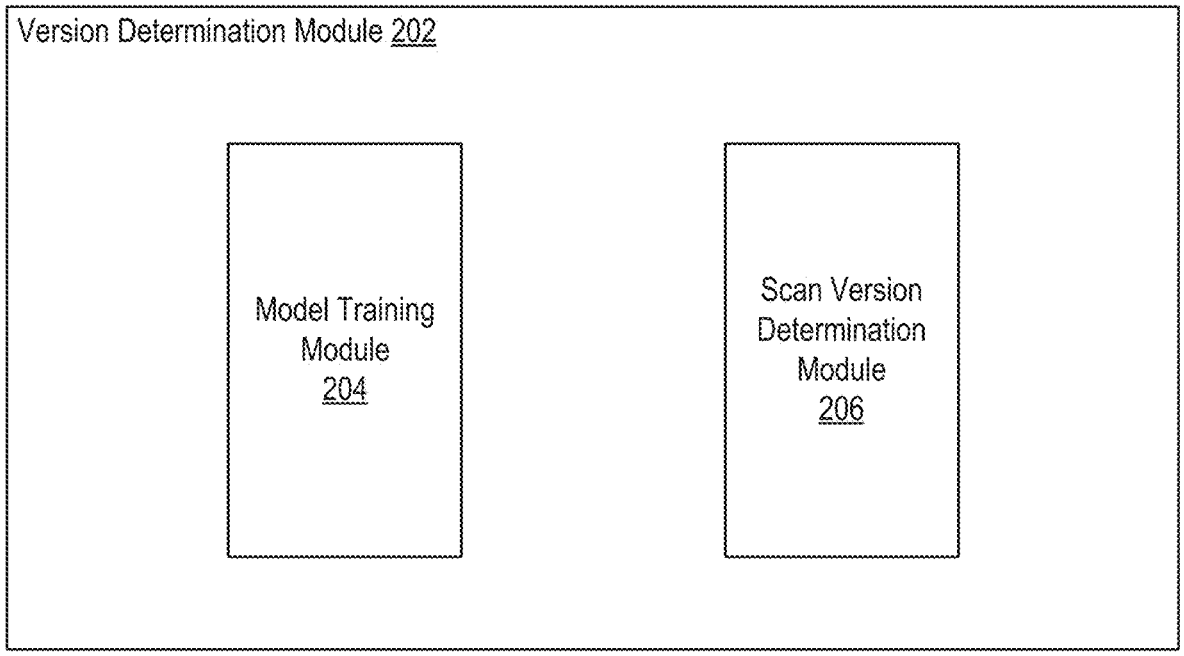
FIG. 2 illustrates an example version determination module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Providing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user.

Under conventional approaches, a user typically interacts with the social networking system through a software application running on a computing device. This software application typically relies on a network connection (e.g., Internet connection) between the computing device and the social networking system. In some instances, such software applications can be used to download, view, and/or interact with a content feed comprising one or more content items. Content feeds may include a large number of content items, such that a user may view and/or interact with a large number of content items in a short period of time. Furthermore, such content items may include multimedia content items that may be substantial in size, such as images and videos. Due to the size of content items being acquired for a content feed, it may be difficult to acquire content items in real-time as a user scrolls through a content feed. In such scenarios, user experience may be hampered by long load times, failure to load or render content items, and interrupted interaction with content items. Conventional approaches may not be effective in addressing these and other problems arising in computer technology.

An improved approach rooted in computer technology overcomes the foregoing and other disadvantages associated with conventional approaches specifically arising in the realm of computer technology. In general, a content item may comprise a plurality of scan versions. For example, the content item may be an image encoded in a progressive JPEG format, such that the image comprises a plurality of scans defining a plurality of scan versions. Each scan version may be associated with a particular file size. For example, if a particular image has four scans, the image may comprise a 1-scan version, a 2-scan version, a 3-scan version, and a 4-scan version. The 1-scan version may have a smallest file size, the 2-scan version may have a second smallest file size, the 3-scan version may have a third smallest file size, and the 4-scan version may have a largest file size. Similarly, each scan version may be associated with a particular level of quality. For example, in the example of a progressive JPEG image having four scans, the 1-scan version may be associated with a lowest quality, the 2-scan version may be associated with a second lowest quality, the 3-scan version may be associated with a third lowest quality, and the 4-scan version may be associated with a highest quality. When a particular content item is to be transmitted to a user (e.g., to a client computing device), a determination can be made as to which scan version of the content item should be transmitted to the user. In an embodiment, the determination of which scan version to provide to a user may be made based on one or more machine learning models. The one or more machine learning models can be trained based on past content render data to determine, based on various characteristics, a render score indicative of a likelihood that a particular content item (or content item scan version) having a particular file size will be successfully downloaded and rendered by a user client device. Render scores can be calculated for one or more scan versions of a content item. The highest quality scan version that satisfies a minimum render score threshold can be selected for transmission to a user. More details relating to the disclosed technology are provided below.

FIG. 1 illustrates an example system 100 including a content provider module 102, according to an embodiment of the present disclosure. As shown in the example of FIG. 1, the content provider module 102 can include a content module 104, a follow module 106, an interaction module 108, a story module 110, and a version determination module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data.

The content module 104 can be configured to provide users with access to content that is posted through a content provider (e.g., a social networking system). For example, the content module 104 can provide a first user with access to content items through an interface. This interface may be provided through a display of a computing device being accessed by the first user. The first user can also interact with the interface to post content items to the social networking system. Such content items may include text, images, audio, and videos, for example. For example, the first user can submit a post to be published through the social networking system. In some embodiments, the post can include, or reference, one or more content items.

In various embodiments, other users of a social networking system can access content items posted by the first user. In one example, the other users can access the content items by searching for the first user by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user interaction are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user interaction can include emoji-based reactions to a content item (e.g., selecting an option that corresponds to a particular reaction emoji, e.g., happy, sad, angry, etc.) and re-sharing a content item, for example. In some embodiments, such information can be stored in a social graph as described in reference to FIG. 6.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., after 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the version determination module 112 can be configured to identify a particular version (or scan version) of a content item to be transmitted to a user. In certain embodiments, a machine learning model can be trained to determine a likelihood that a particular content item (or a particular scan version of a content item), having a particular size, will be successfully rendered by a client computing device. In an embodiment, this likelihood may be represented by a render score. In an embodiment, the version determination module 112 can utilize the machine learning model to calculate render scores for one or more different versions (e.g., scan versions) of a content item. The version determination module 112 can be configured to select a particular version (e.g., scan version) of a content item based on the render scores. Content item information, including the scan version selected, can be transmitted to a client device. At an appropriate time, the client device can request the specified scan version of a content item, and the requested scan version of the content item can be transmitted to the client device. More details regarding the version determination module 112 will be provided below with reference to FIG. 2.

FIG. 2 illustrates an example version determination module 202 according to an embodiment of the present disclosure. In some embodiments, the version determination module 112 of FIG. 1 can be implemented as the version determination module 202. As shown in the example of FIG. 2, the version determination module 202 can include a model training module 204 and a scan version determination module 206.

The model training module 204 can be configured to train one or more machine learning models based on training data. In various embodiments, the training data can comprise historical information pertaining to past attempts to render content items. This historical information can include, for example, information pertaining to past instances in which a client computing device has requested content items from a content provider to be presented to a user. Each instance included in the training data can be associated with a particular client computing device associated with a set of client computing device information, a particular user associated with a set of user information, and a particular content item associated with a set of content item information. The client computing device information can include, for example, device type information, connection type information, bandwidth information at the time a content item was requested, and the like. User information can include, for example, a percent of photos rendered value (i.e., a PPR value) indicative of what percentage of content items transmitted for presentation to the user are successfully rendered. For example, a user with a relatively high PPR value may indicate that content items transmitted to the user are often rendered successfully. Conversely, a user with a lower PPR value may indicate that content items transmitted to the user are less frequently rendered successfully. Successful and unsuccessful renders, and various embodiments thereof, are described in greater detail below. In an embodiment, user information can include a PPR value for content items transmitted to the user over the previous day (i.e., 24 hours), or another defined time period. Content item information can include, for example, file size information. The machine learning model can be trained to determine a render score indicative of a likelihood that a content item, having a particular set of content item characteristics (e.g., a particular file size), will be successfully transmitted and rendered if the content item is transmitted to a particular user on a particular computing device.

The model training module 204 can train a machine learning module based on one or more labels. In an embodiment, a machine learning model can be trained based on binary labeling of previous instances of content render attempts as positive or negative examples. In one example, an instance in which a content item was requested by a client computing device and was successfully rendered can be labeled as a positive example. Conversely, an instance in which a content item was requested, but the content was not successfully rendered can be labeled as a negative example.

"Successful" and "unsuccessful" renders may be defined differently in different embodiments. As mentioned above, in an embodiment, a content item can be segmented into a plurality of segments, or scans. Each scan can be configured such that it allows for rendering of the entire content item, with different scans allowing for rendering of the content item at different levels of quality. In one embodiment, the plurality of scans can be ordered (e.g., arranged in a hierarchical fashion), such that scans can build upon earlier-ordered scans to render the content item at progressively higher qualities. For example, if a content item is divided into nine scans, a first scan can allow for the entire content item to be rendered at a first, lowest quality; a second scan can build upon the first scan to render the entire content item at a second quality that is higher than the first quality; a third scan can build upon the first and second scans to render the entire content item at a third quality that is higher than the second quality, and so forth. If all nine scans of the content item are downloaded, the content item can be rendered at an optimal quality using all nine scans of the content item. One example of content items configured in this manner are images encoded in a progressive JPEG format. In an embodiment, an attempt to render a content item may be classified as a successful render if a threshold number of scans of the content item are successfully transmitted to a client computing device before the content item moves out of view on a display of the client computing device. For example, consider an example scenario in which content items are divided into nine scans, and the threshold number of scans required for a successful render is set to six scans.

If six or more scans of a content item are successfully transmitted to a client computing device before the content item moves out of view, this instance may be classified as a successful render. However, if a user has already scrolled past the content item within a content feed such that the content item is no longer visible by the time the six scans are downloaded, this instance would be classified as an unsuccessful render.

In certain instances, a content provider may instruct a client computing device to request only a certain number of scans for a particular content item. Furthermore, the number of scans specified by the content provider may fall below the threshold number of scans associated with a "successful" render. In certain embodiments, instances in which the specified number of scans are successfully transmitted to the client computing device before the content item moves out of view on the client computing device may also be classified as successful renders, even if the specified number of scans is fewer than the threshold number of scans. For example, the threshold number of scans for classifying a render attempt as a "successful" render may be set to six out of nine scans. Instances in which six or more scans for a content item were successfully transmitted to a client computing device before the content item moves out of view can be classified as successful renders. However, if a content provider has instructed a client computing device to request only four out of nine scans for a particular content item, and the four scans were successfully transmitted to the client computing device before the content item moved out of view, this instance may also be classified as a successful render.

The scan version determination module 206 can be configured to select a particular scan version of a content item to be transmitted to a particular user. As discussed above, in an embodiment, a machine learning model trained by the model training module 204 can be configured to receive user information associated with a user, client computing device information associated with a client computing device, and content item information associated with a content item (or a particular scan version of a content item), and determine a render score indicative of a likelihood that the content item will successfully render if transmitted to the user on the client computing device. The scan version determination module 206 can receive a request from a client computing device for one or more content items. Before transmitting content to the client computing device, the scan version determination module 206 can determine a scan version for each content item to be sent in order to increase a likelihood that the one or more content items will be successfully transmitted to and rendered on the client computing device.

As discussed above, each content item can comprise a plurality of scans. Each scan of a content item may define a particular scan version. For example, if a content item has nine scans, the content item can have a 1-scan version, a 2-scan version, a 3-scan version, a 4-scan version, a 5-scan version, a 6-scan version, a 7-scan version, an 8-scan version, and a 9-scan version. As also mentioned above, higher scan versions may be associated with a higher level of quality than lower scan versions, and, accordingly, higher scan versions may have larger file sizes than lower scan versions. For example, a 3-scan version of a content item may have a higher quality and a larger file size than a 1-scan version of the content item, but a lower quality and a smaller file size than a 7-scan version of the content item. If a particular content item is identified for transmission to a user on a client computing device, the scan version determination module 206 can be configured to calculate render scores for a plurality of scan versions of the content item based on the machine learning model trained by the model training module 204. The scan version determination module 206 can then select one scan version of the plurality of scan versions for transmission to the user based on the render scores. In one embodiment, the scan version determination module 206 can select a highest scan version that satisfies a render score threshold. For example, consider a scenario in which a first content item, having nine scans, is to be transmitted to a first user on a first client computing device. The scan version determination module 206 can calculate render scores for at least some of the nine scan versions of the first content item using a machine learning model. The render scores may as follows:

| Scan Version | Render Score |
|---|---|
| 6 | .9 |
| 7 | .85 |
| 8 | .8 |
| 9 | .75 |

In this example scenario, the 6-scan version has the highest render score, indicating that the 6-scan version has the highest likelihood of being rendered successfully on the first client computing device. If the render score threshold is set to 0.85, the highest scan version that satisfies the render score threshold is the 7-scan version. As such, the scan version determination module 206 can select the 7-scan version of the first content item to be transmitted to the first user on the first client computing device.

In an embodiment, the scan version determination module 206 determines render scores for only a subset of scan versions for a given content item. For example, while a particular content item may have nine scans, and therefore nine scan versions, the scan version determination module 206 can be configured to calculate render scores for only the 6-scan version and above. In such embodiments, if none of the scan versions satisfy a render score threshold, a minimum acceptable scan version may be selected. For example, if render scores are calculated for only the 6-scan version and above, and none of the scan versions satisfy the render score threshold, the scan version determination module 206 may select the 6-scan version (the lowest scan version for which a render score was calculated).

In an embodiment, the scan version determination module 206 can be configured to transmit content information to a client computing device. The content information may specify to the client computing device information about one or more content items that have been identified for transmission to the client computing device. For example, the content information may include a file location (e.g., a URL) for each content item that has been identified for transmission to the client computing device, as well as a scan version (i.e., a number of scans) to be requested for each content item. In an embodiment, the content information may be transmitted to the client computing device in a JSON file. By providing this information to the client computing device, the client computing device can, at the appropriate time, request from a content provider a particular content item (e.g., using the URL for the content item), as well as a particular scan version of the particular content item. Upon receiving the request from the client computing device, the scan version determination module 206 can transmit the appropriate scan version of the content item to the client computing device.

Figure 3:
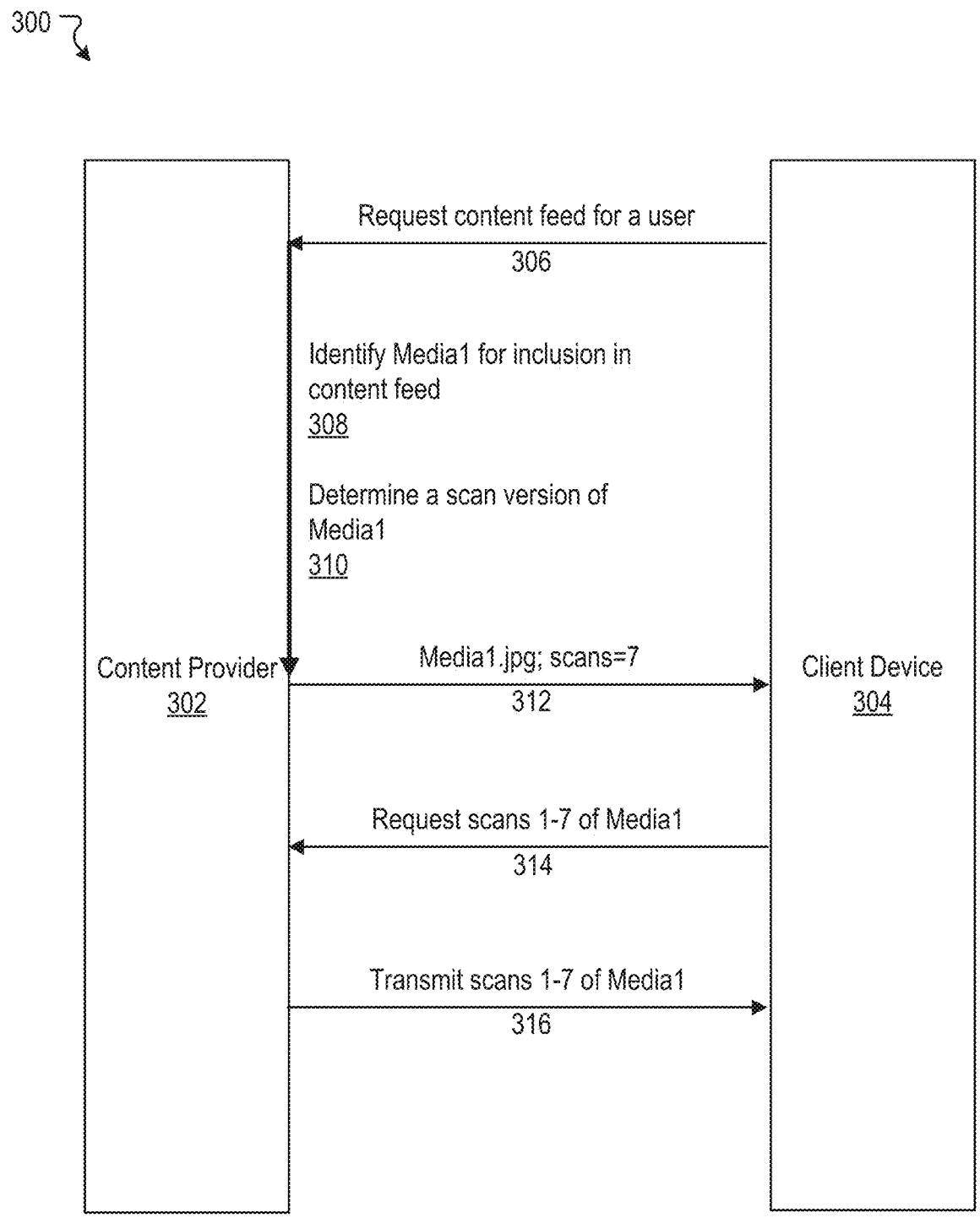
FIG. 3 illustrates an example scenario including a timing diagram depicting interactions between a content provider and a client device, according to an embodiment of the present disclosure.

FIG. 3 illustrates an example scenario 300 represented by a timing diagram which demonstrates an example set of interactions between a content provider 302 and a client device 304, according to an embodiment of the present disclosure. In some embodiments, the content provider 302 can be implemented as the content provider module 102 of FIG. 1.

In the example scenario 300, at step 306, the client device 304 requests content for a content feed to be presented to a user. At step 308, the content provider 302 identifies one or more content items that can be presented to the user. In the example scenario 300, the content provider 302 has identified a content item, Media1, for transmission to the client device 304. At step 310, the content provider 302 determines a scan version of Media1 to be transmitted to the client device 304. For example, the content provider 302 can calculate render scores for at least some of the scan versions of Media1 based on a machine learning model, and select a scan version based on the render scores. At step 312, the content provider 302 responds to the request from the client device 304 with content information identifying one or more content items (in this case, identifying Media1 .jpg), and identifying a scan version for each content item. In this example, the 7-scan version of Media1 has been selected, and the content information indicates this to be the case. As mentioned, the content information may be transmitted to the client device 304, for example, in a JSON file.

At step 314, the client device 304 requests the 7-scan version of Media1 by requesting scans 1-7 of Media1 based on the content information it received in step 312. This may occur, for example, at a later time when Media1 is to be presented to a user. At step 316, the content provider 302 transmits scans 1-7 of Media1 (i.e., the 7-scan version of Media1) to the client device 304.

FIG. 4 illustrates an example method 400 associated with content provision, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can, for a first content item comprising a plurality of scan versions, calculate render scores for at least some of the plurality of scan versions, each render score being indicative of a likelihood of an associated scan version to render successfully on a client computing device. At block 404, the example method 400 can, select a first scan version of the plurality of scan versions based on the render scores. At block 406, the example method 400 can transmit the first scan version of the first content item to the client computing device.

Figure 5:
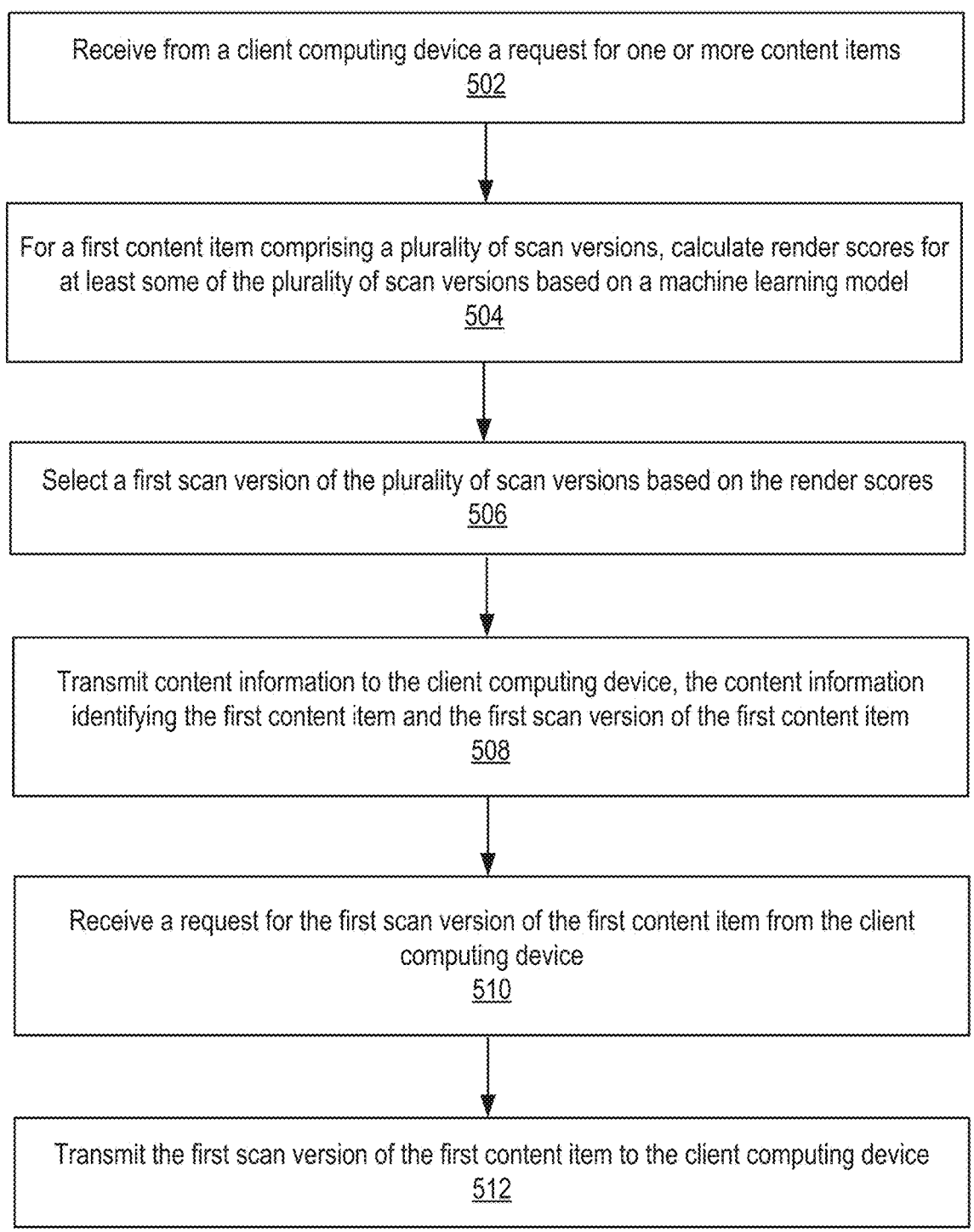
FIG. 5 illustrates another example method associated with content provision, according to an embodiment of the present disclosure.

FIG. 5 illustrates an example method 500 associated with content provision, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive from a client computing device a request for one or more content items. At block 504, the example method 500 can, for a first content item comprising a plurality of scan versions, calculate render scores for at least some of the plurality of scan versions based on a machine learning model. At block 506, the example method 500 can select a first scan version of the plurality of scan versions based on the render scores. At block 508, the example method 500 can transmit content information to the client computing device, the content information identifying the first content item and the first scan version of the first content item. At block 510, the example method 500 can receive a request for the first scan version of the first content item from the client computing device. At block 512, the example method 500 can transmit the first scan version of the first content item to the client computing device.

It is contemplated that there can be many other uses, applications, and/or variations associated with the various embodiments of the present disclosure. For example, in some cases, users can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
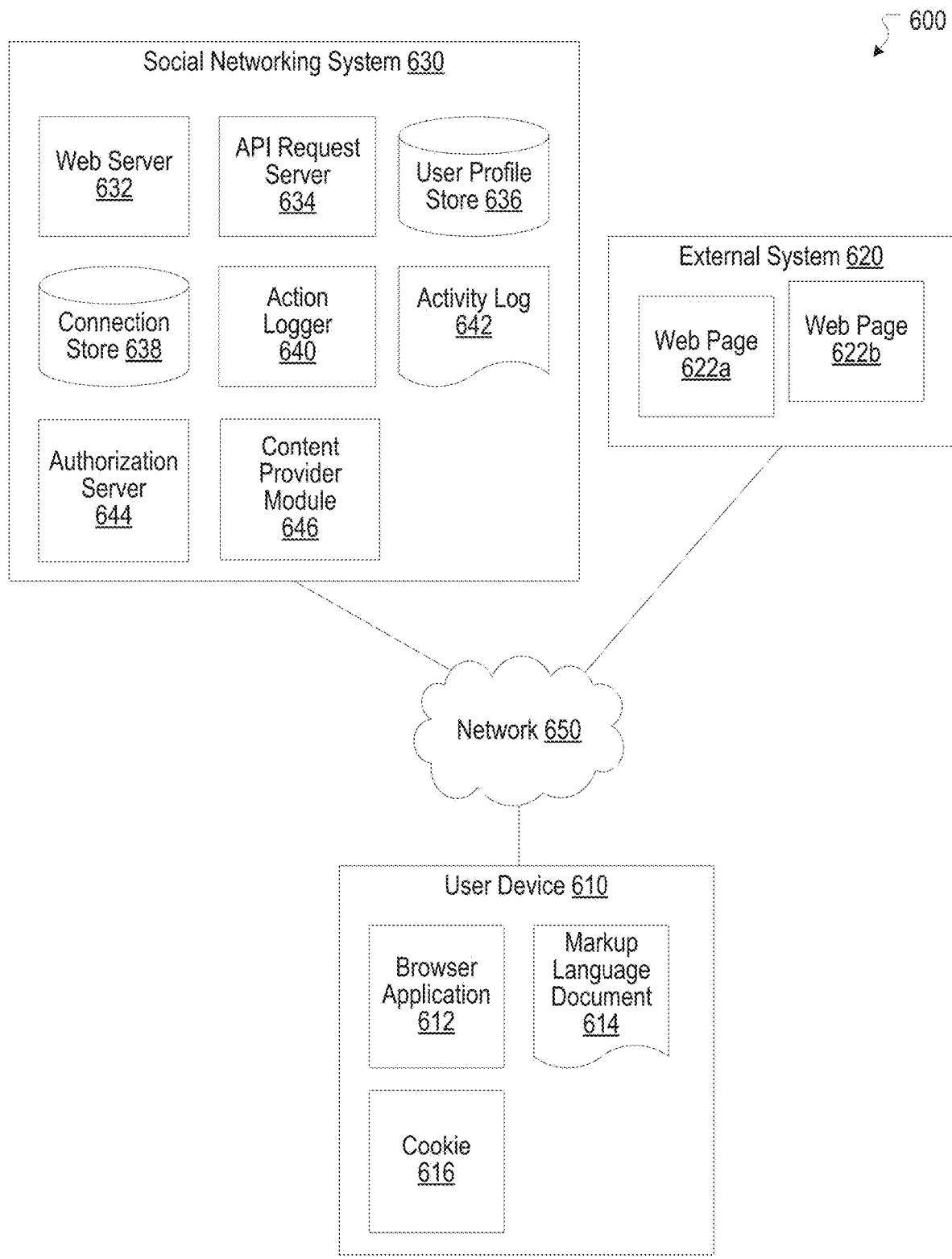
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. In some embodiments, one or more functionalities of the content provider module 646 can be implemented in the user device 610. As discussed previously, it should be appreciated that there can be many variations or other possibilities.

Hardware Implementation

Figure 7:
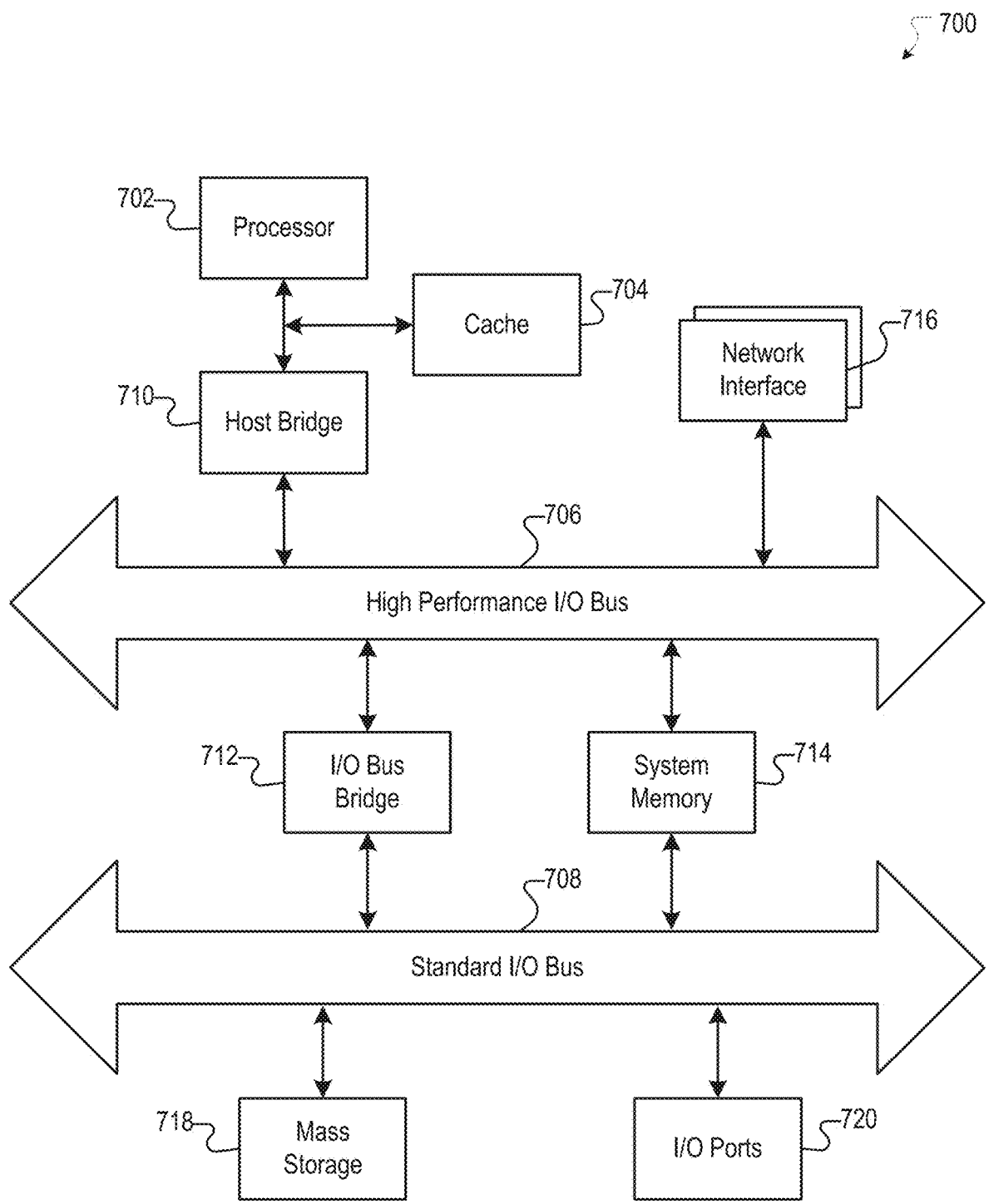
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a plurality of scan versions of a first content item, wherein the plurality of scan versions include at least (i) a first scan version associated with a first number of progressive scans of the first content item and (ii) a second scan version associated with a second number of progressive scans of the first content item that build upon the first number of progressive scans associated with the first scan version;
    training, by the computing system, a machine learning model to calculate render scores for different scan versions of content items based on training data, wherein the training data comprises a first set of instances including a content item labeled as a successful render, wherein a successful render is based on a number of scans of the content item transmitted to a device before the content item moved out of view on a display of the device satisfying a threshold value;
    calculating, by the computing system, render scores for the plurality of scan versions of the first content item based on the machine learning model, wherein a render score associated with a scan version represents a likelihood that the scan version will render successfully on a first client computing device;
    selecting, by the computing system, the first scan version of the plurality of scan versions based on the render scores; and
    providing, by the computing system, the first scan version of the first content item to the first client computing device.

2. The computer-implemented method of claim 1, wherein
    the training data further comprises a second set of instances labeled as unsuccessful renders.

3. The computer-implemented method of claim 1, wherein the machine learning model is configured to calculate a render score for a scan version of a content item based on a file size for the scan version of the content item.

4. The computer-implemented method of claim 1, wherein the first scan version is selected based on a determination that the first scan version is a scan version of a highest level of quality that also satisfies a render score threshold.

5. The computer-implemented method of claim 1, further comprising: transmitting, by the computing system, content information to the first client computing device, the content information identifying the first content item and the first scan version of the first content item.

6. The computer-implemented method of claim 5, wherein the content information identifies a plurality of content items, and scan versions for each content item of the plurality of content items.

7. The computer-implemented method of claim 6, wherein the content information is transmitted in a JSON file format.

8. The computer-implemented method of claim 5, further comprising: receiving, by the computing system, from the client computing device a request for the first scan version of the first content item.

9. The computer-implemented method of claim 1, wherein the first content item is an image encoded in a progressive JPEG format.

10. A system comprising:
    at least one processor; and
    a memory storing instructions that, when executed by the at least one processor, cause the system to perform a method comprising:
    determining a plurality of scan versions of a first content item, wherein the plurality of scan versions include at least (i) a first scan version associated with a first number of progressive scans of the first content item and (ii) a second scan version associated with a second number of progressive scans of the first content item that build upon the first number of progressive scans associated with the first scan version;
    training a machine learning model to calculate render scores for different scan versions of content items based on training data, wherein the training data comprises a first set of instances including a content item labeled as a successful render, wherein a successful render is based on a number of scans of the content item transmitted to a device before the content item moved out of view on a display of the device satisfying a threshold value;
    calculating render scores for the plurality of scan versions of the first content item based on the machine learning model, wherein a render score associated with a scan version represents a likelihood that the scan version will render successfully on a first client computing device;
    selecting the first scan version of the plurality of scan versions based on the render scores; and
    providing the first scan version of the first content item to the first client computing device.

11. The system of claim 10, wherein
    the training data further comprises a second set of instances labeled as unsuccessful renders.

12. The system of claim 11, wherein the first scan version is selected based on a determination that the first scan version is a scan version of a highest level of quality that also satisfies a render score threshold.

13. The system of claim 10, wherein the first content item is an image encoded in a progressive JPEG format.

14. The system of claim 10, wherein the machine learning model is configured to calculate a render score for a scan version of a content item based on a file size for the scan version of the content item.

15. The system of claim 10, further comprising: transmitting content information to the first client computing device, the content information identifying the first content item and the first scan version of the first content item.

16. A non-transitory computer-readable storage medium including instructions that, when executed by at least one processor of a computing system, cause the computing system to perform a method comprising:

determining a plurality of scan versions of a first content item, wherein the plurality of scan versions include at least (i) a first scan version associated with a first number of progressive scans of the first content item and (ii) a second scan version associated with a second number of progressive scans of the first content item that build upon the first number of progressive scans associated with the first scan version;

training a machine learning model to calculate render scores for different scan versions of content items based on training data, wherein the training data comprises a first set of instances including a content item labeled as a successful render, wherein a successful render is based on a number of scans of the content item transmitted to a device before the content item moved out of view on a display of the device satisfying a threshold value;

calculating render scores for the plurality of scan versions of the first content item based on the machine learning model, wherein a render score associated with a scan version represents a likelihood that the scan version will render successfully on a first client computing device;

selecting the first scan version of the plurality of scan versions based on the render scores; and providing the first scan version of the first content item to the first client computing device.

17. The non-transitory computer-readable storage medium of claim 16, wherein
the training data further comprises a second set of instances labeled as unsuccessful renders.

18. The non-transitory computer-readable storage medium of claim 17, wherein the first scan version is selected based on a determination that the first scan version is a scan version of a highest level of quality that also satisfies a render score threshold.

19. The non-transitory computer-readable storage medium of claim 16, wherein the first content item is an image encoded in a progressive JPEG format.

20. The non-transitory computer-readable storage medium of claim 16, wherein the machine learning model is configured to calculate a render score for a scan version of a content item based on a file size for the scan version of the content item.

* * * * *